United States Patent
Toggweiler et al.

(10) Patent No.: US 9,440,536 B2
(45) Date of Patent: Sep. 13, 2016

(54) PASSENGER VEHICLE WITH A MODULAR CONTROL PANEL

(71) Applicants: VOLKSWAGEN AG, Wolfsburg (DE); AUDI AG, Ingolstadt (DE)

(72) Inventors: James Leigh Toggweiler, San Francisco, CA (US); Matthew Jolda, Palo Alto, CA (US); Nathaniel Paffett-Lugassy, San Francisco, CA (US); Jaime Camhi, San Jose, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 137 days.

(21) Appl. No.: 14/265,559

(22) Filed: Apr. 30, 2014

(65) Prior Publication Data

US 2015/0314683 A1    Nov. 5, 2015

(51) Int. Cl.

| | |
|---|---|
| *B60K 37/02* | (2006.01) |
| *G06F 3/0488* | (2013.01) |
| *G06F 3/041* | (2006.01) |
| *G06F 1/16* | (2006.01) |
| *G06F 3/0484* | (2013.01) |
| *B60K 37/06* | (2006.01) |

(52) U.S. Cl.
CPC .............. *B60K 37/02* (2013.01); *B60K 37/06* (2013.01); *G06F 1/16* (2013.01); *G06F 3/0412* (2013.01); *G06F 3/0416* (2013.01); *G06F 3/0488* (2013.01); *G06F 3/04847* (2013.01); *G06F 3/04886* (2013.01); *B60K 2350/102* (2013.01); *B60K 2350/104* (2013.01); *B60K 2350/106* (2013.01); *B60K 2350/1016* (2013.01); *B60K 2350/1024* (2013.01); *B60K 2350/1032* (2013.01); *B60K 2350/945* (2013.01)

(58) Field of Classification Search
CPC ...... G01C 21/36; B60K 37/02; B60K 37/06; B60K 2350/1016; B60K 2350/102; B60K 2350/1024; B60K 2350/1032; B60K 2350/104; B60K 2350/106; B60K 2350/945; G06F 1/16; G06F 3/0416; G06F 3/04847; G06F 3/0488; G06F 3/04886

See application file for complete search history.

(56) References Cited

U.S. PATENT DOCUMENTS

| | | | |
|---|---|---|---|
| 5,742,894 A | 4/1998 | Jambhekar et al. | |
| 7,226,268 B2* | 6/2007 | Gustafson | A01B 59/002 37/406 |
| 8,382,191 B2* | 2/2013 | Hafften | F41H 5/226 296/146.1 |
| 2002/0084700 A1* | 7/2002 | DeLeeuw | H04B 1/082 307/140 |
| 2003/0208314 A1* | 11/2003 | Funk | G01C 21/3688 701/500 |
| 2005/0123148 A1* | 6/2005 | Ohler | B60R 11/02 381/86 |
| 2006/0046778 A1* | 3/2006 | Hembree | H04B 1/082 455/557 |
| 2009/0024275 A1* | 1/2009 | Hayes | B60K 35/00 701/36 |
| 2009/0273575 A1 | 11/2009 | Pryor | |
| 2010/0033728 A1* | 2/2010 | Jacobson | G01J 3/02 356/451 |
| 2010/0250071 A1* | 9/2010 | Pala | B60K 35/00 701/48 |
| 2013/0058014 A1* | 3/2013 | King, II | B60R 11/0211 361/679.01 |

FOREIGN PATENT DOCUMENTS

| | | |
|---|---|---|
| DE | 102009058144 A1 | 6/2011 |
| EP | 1018680 A2 | 7/2000 |
| EP | 1352774 A2 | 10/2003 |

OTHER PUBLICATIONS

Extended Search Report for European Patent Application No. 15164980.3; Feb. 22, 2016.

* cited by examiner

*Primary Examiner* — Tuan C. To
(74) *Attorney, Agent, or Firm* — Barnes & Thornburg LLP

(57) ABSTRACT

A passenger vehicle includes a control panel that receives user inputs. The control panel includes a contact sensor and a face plate that extends over the contact sensor. The face plate has a plurality of control elements that interact with the contact sensor during use of the control panel.

20 Claims, 6 Drawing Sheets

PASSENGER VEHICLE WITH A MODULAR CONTROL PANEL

BACKGROUND

The present disclosure relates to control panels for passenger vehicles. More specifically, the present disclosure is directed to passenger vehicles with modular control panels.

SUMMARY

According to the present disclosure, a modular control panel adapted for use in a passenger vehicle dashboard may include a contact sensor and a face plate arranged over the contact sensor. The face plate may include a mount frame and a plurality of movable control elements each coupled to the mount frame to move relative to the mount frame.

In illustrative embodiments, the contact sensor may detect contacts over a substantially monolithic contact area. In some embodiments, each of the plurality of movable control elements may engage the substantially monolithic contact area of the contact sensor in response to a user moving the movable control elements relative to the mount frame.

In illustrative embodiments, at least one of the plurality of movable control elements may be a button coupled to the mount frame to move relative to the mount frame. Also, at least one of the moveable control elements may be a knob coupled to the mount frame to rotate relative to the mount frame about an axis.

In illustrative embodiments, the button may be coupled to the mount frame to move from a deactivated position, spaced apart from or in light contact with the substantially monolithic contact area, to a push-activation position, engaged with the substantially monolithic contact area to exert a predetermined pressure on the substantially monolithic contact area. The knob may be coupled to the mount frame to rotate from a first position engaging the substantially monolithic contact area at a first location along a circle that extends around the axis to a second position engaging the substantially monolithic contact area at a second location along the circle that extends around the axis.

In illustrative embodiments, the face plate may include a flexible membrane that includes a main sheet and a plurality of deformable control elements. The plurality of deformable control elements may engage the substantially monolithic contact area of the contact sensor in response to a user applying a force onto the deformable control elements.

In illustrative embodiments, at least one of the deformable control elements may be an indentation that extends from the main sheet toward the substantially monolithic contact area of the contact sensor. The indentation may be elongated to form a channel sized to receive a fingertip and to allow a fingertip to swipe along the channel.

According to another aspect of the present disclosure, a passenger vehicle may include a plurality of subsystems, a controller coupled to the subsystems to direct operation of the plurality of subsystems, and a modular control panel coupled to the controller to provide signals to the controller. The signals may be indicative of user inputs received by the modular control panel associated with the plurality of subsystems.

In illustrative embodiments, the modular control panel may include a contact sensor that detects contacts over a substantially monolithic contact area and a face plate that extends over the substantially monolithic contact area. The face plate may include a mount frame and a plurality of movable control elements each coupled to the mount frame to move relative to the mount frame. Each of the plurality of movable control elements may engage the substantially monolithic contact area of the contact sensor in response to a user moving the movable control elements relative to the mount frame.

In illustrative embodiments, at least one of the plurality of movable control elements may be a button coupled to the mount frame to slide relative to the mount frame from a deactivated position, to a touch-activation position, and further to a push-activation position. In the deactivated position, the button may be spaced apart from or in light contact with the substantially monolithic contact area. In the touch-activation position, the button may apply a touch-activation pressure on the substantially monolithic contact area in response to a user applying a touch force on to the button. In the fully-activated position, the button may apply a push-activation pressure, greater than the touch-activation pressure, on the substantially monolithic contact area in response to a user applying a press force, greater than the touch force, on to the button.

In illustrative embodiments, the controller may adjust a parameter of at least one subsystem at a first rate of change in response to receipt of a signal from the modular control panel associated with the button being moved to the push-activation position and maintained in the push-activation position by a first amount of force. The controller may also adjust the parameter of the at least one subsystem at a second rate of change, greater than the first rate of change, in response to receipt of a signal from the modular control panel associated with the button being moved to the push-activation position and maintained in the push-activation position by a second amount of force, greater than the first amount of force.

In illustrative embodiments, the passenger vehicle may include a display coupled to the controller. The controller may display indicia suggestive of a parameter of at least one subsystem that will be changed in response to receipt of a signal from the modular control panel associated with the button being moved to the touch-activation position and the controller may change the parameter of the at least one subsystem in response to receipt of a signal from the modular control panel associated with the button being moved to the push-activation position.

In illustrative embodiments, at least one of the plurality of movable control elements may be a button coupled to the mount frame to move relative to the mount frame. Also, at least one of the plurality of moveable control elements may be a knob coupled to the mount frame to rotate relative to the mount frame about an axis.

In illustrative embodiments, the button may be coupled to the mount frame to move from a deactivated position spaced apart from the substantially monolithic contact area of the contact sensor to a push-activation position that engages the substantially monolithic contact area of the contact sensor. The knob may be coupled to the mount frame to rotate from a first position that engages the substantially monolithic contact area of the contact sensor at a first location along a circle that extends around the axis to a second position that engages the substantially monolithic contact area of the contact sensor at a second location along the circle that extends around the axis.

In illustrative embodiments, the face plate may include a flexible membrane includes a main sheet and a plurality of deformable control elements. The deformable control elements may engage the substantially monolithic contact area of the contact sensor in response to a user applying a force onto the deformable control elements. At least one of the deformable control elements may be an indentation that extends from the main sheet toward the substantially monolithic contact area of the contact sensor.

According to another aspect of the present disclosure, a modular control panel system for use in a passenger vehicle may include a contact sensor, a first face plate, and a second face plate. The first face plate may be mounted adjacent to the contact sensor. The second face plate may be mounted adjacent to the contact sensor in place of the first face plate.

In illustrative embodiments, the contact sensor may detect contacts over a substantially monolithic contact area. The first face plate may be sized to extend over the substantially monolithic contact area of the contact sensor and may include a first mount frame and a first plurality of movable control elements. The second face plate may be sized to extend over the substantially monolithic contact area of the contact sensor and may include a second mount frame and a second plurality of movable control elements, different from the first plurality of movable control elements.

In illustrative embodiments, at least one of the first plurality of movable control elements may be a button coupled to the mount frame to move relative to the mount frame. Also, at least one of the first plurality of moveable control elements may be a knob coupled to the mount frame to rotate relative to the mount frame about an axis.

In illustrative embodiments, the first face plate may include a first flexible membrane includes a first main sheet and a first plurality of deformable control elements that engage the substantially monolithic contact area of the contact sensor in response to a user applying a force onto the deformable control elements. At least one of the first plurality deformable control elements may be an indentation that extends from the first main sheet toward the substantially monolithic contact area of the contact sensor.

In illustrative embodiments, the modular control panel system may include a face-plate-identification mechanism that determines if the first face plate is mounted adjacent to the contact sensor or if the second face plate is mounted adjacent to the contact sensor. The face-plate-identification mechanism may include at least one identification protrusion that extends from the mount frame of the first face plate. The at least one identification protrusion may engage the substantially monolithic contact area of the contact sensor in a predetermined location when the first face plate is mounted adjacent to the contact sensor Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1:
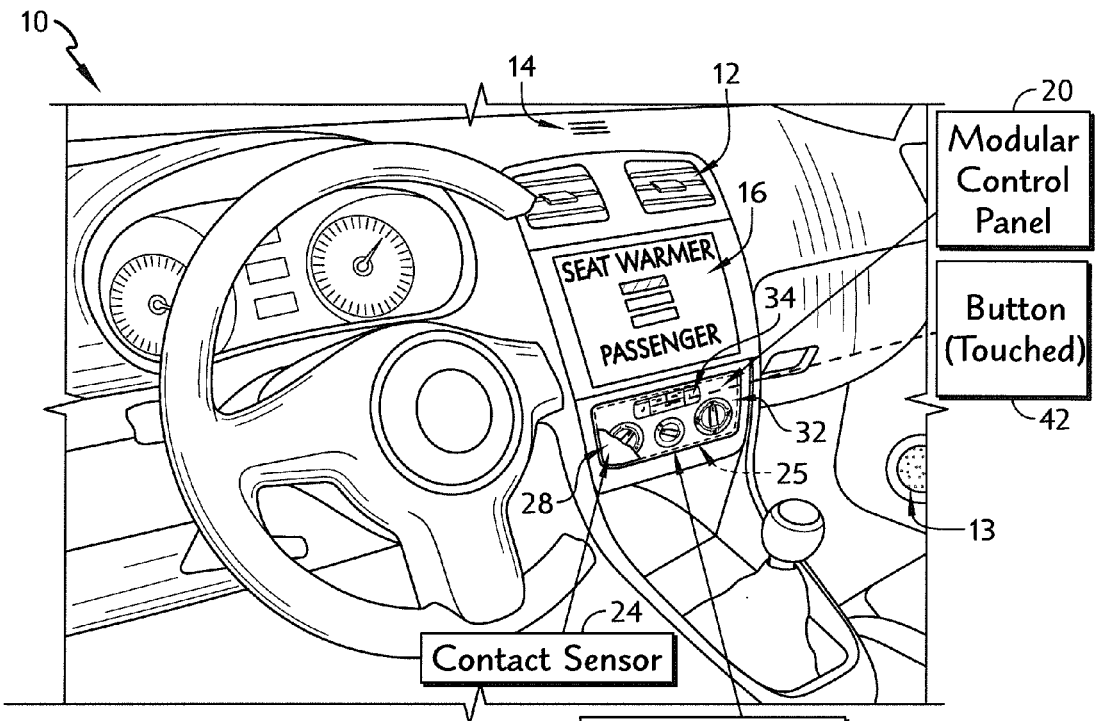
FIG. 1 is a perspective view of a passenger vehicle showing that the passenger vehicle includes a modular control panel having a contact sensor and an overlying first face plate that is interchangeable with other face plates so that a variety of control layouts can be provided by the modular control panel.
Figure 2:
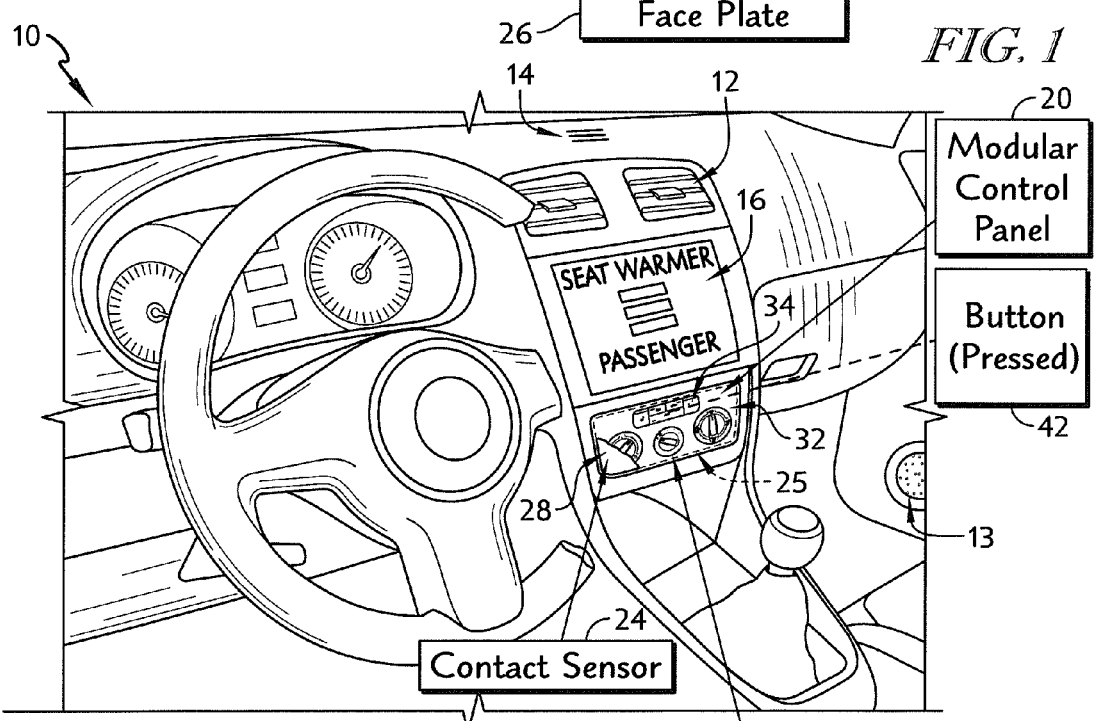
FIG. 2 is a view similar to FIG. 1 showing that a display arranged for viewing by a user included in the passenger vehicle shows a change in the state of a vehicle parameter in response to a user pushing a button after the display showed a current state of the vehicle parameter in response to a user touching the button as shown in FIG. 1.

An illustrative passenger vehicle 10 includes a number of subsystems 12, 13, 14, a display 16, a controller 18, and a modular control panel 20 as shown, for example, in FIGS. 1 and 2. The subsystems 12, 13, 14 illustratively provide temperature control functions and infotainment functions to users in the passenger vehicle 10. The display 16 is coupled to a dashboard 22 of the passenger vehicle 10 and may be viewed by users in the passenger vehicle 10. The controller 18 is illustratively housed in the dashboard 22 and is coupled to the subsystems 12, 13, 14, the display 16, and the modular control panel 20 to direct operation of the subsystems 12, 13, 14 and the display 16. The modular control panel 20 receives various user inputs associated with the subsystems 12, 13, 14 and provides signals to the controller 18 indicative of the received user inputs.

Figure 3:
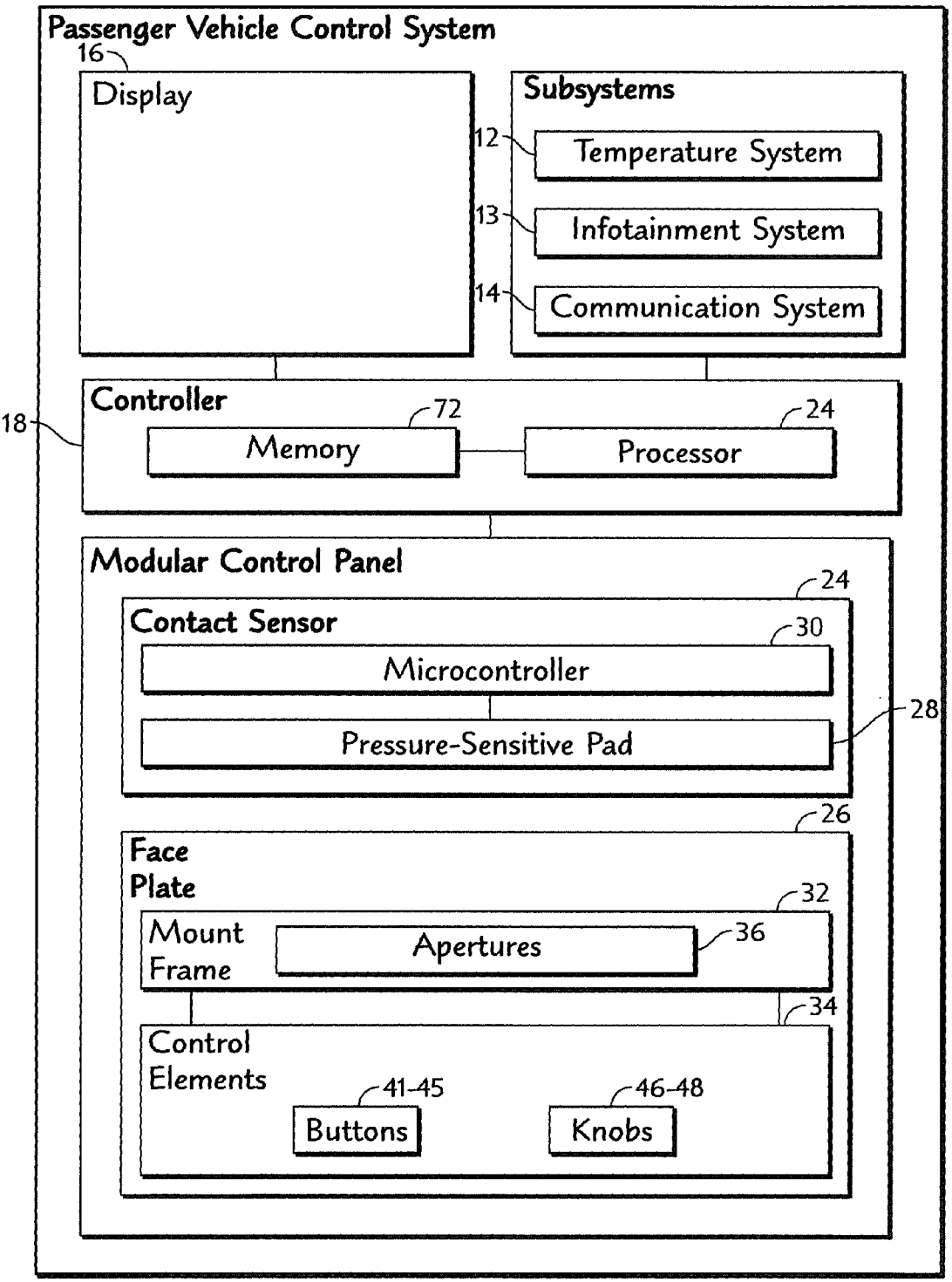
FIG. 3 is a diagrammatic view of the passenger vehicle of FIGS. 1 and 2 showing that the modular control panel is coupled to a controller which is in turn coupled to the display and a number of vehicle subsystems.

The modular control panel 20 is reconfigurable for use in a variety of passenger vehicles to provide a number of different user interface options and to accommodate a number of different subsystem combinations that may be present in a particular passenger vehicle as suggested in FIGS. 1, 4, 6, and 8. The modular control panel 20 shown in FIGS. 1-3 illustratively includes a contact sensor 24 that provides a substantially monolithic contact area 25 and a face plate 26 that overlies the contact sensor 24 to engage various predetermined locations within the contact area 25 when manipulated by a user. The contact sensor 24 is adapted for use in a variety of passenger vehicles and provides signals associated with a number of subsystem combinations. The face plate 26 is interchangeable with other face plates (e.g., face plate 226 shown in FIG. 4 and face plate 326 shown in FIG. 6) and provides a particular user interface for a corresponding subsystem combination.

In the illustrative embodiment, the contact sensor 24 includes a pressure-sensitive pad 28 and a microcontroller 30 as shown diagrammatically in FIG. 3. The pressure-sensitive pad 28 defines the contact area 25 and detects pressure levels applied at locations within the contact area 25. The pressure-sensitive pad 28 is illustratively semi-transparent to allow backlights (Light Emitting Diodes (LEDs)) associated with the modular control panel 20 to shine through the face plate 26 and convey information to a user. The microcontroller 30 is coupled to the pressure-sensitive pad 28 and produces signals in response to detection of a pressure input at a preselected location onto the contact area 25.

In other embodiments, the pressure-sensitive pad 28 included in the contact sensor 24 may be replaced by a capacitive pad, an optical sensor, a magnetic field distortion sensor, or another sensing device that detects location-specific interaction within a generally monolithic contact area. The location-specific interaction from the face plate 26 may correspond to contacts made by the face plate 26 onto the contact sensor 24 or to contacts made by a user onto the face plate 26 that are subsequently detected by the contact sensor 24. In such embodiments, the interchangeable face plates 26, 226, 326 may be configured to interact with the particular sensing device used in the modular control panel 20.

The face plate 26 illustratively extends over the pressure-sensitive pad 28 included in the contact sensor 24 and exerts pressure onto the pressure-sensitive pad 28 in predetermined locations when a user interacts with the face plate 26 as suggested in FIGS. 1 and 2. The face plate 26 includes a mount frame 32 and a plurality of control elements 34 coupled to the mount frame 32. The mount frame 32 is illustratively rigid and includes a plurality of apertures 36. The control elements 34 extend through the apertures 36 formed through the mount frame 32 toward the pressure-sensitive pad 28 and move relative to the mount frame 32 in response to user interaction with particular control elements 34 so that pressure is applied by the control elements 34 onto the pressure-sensitive pad 28.

Figure 5:
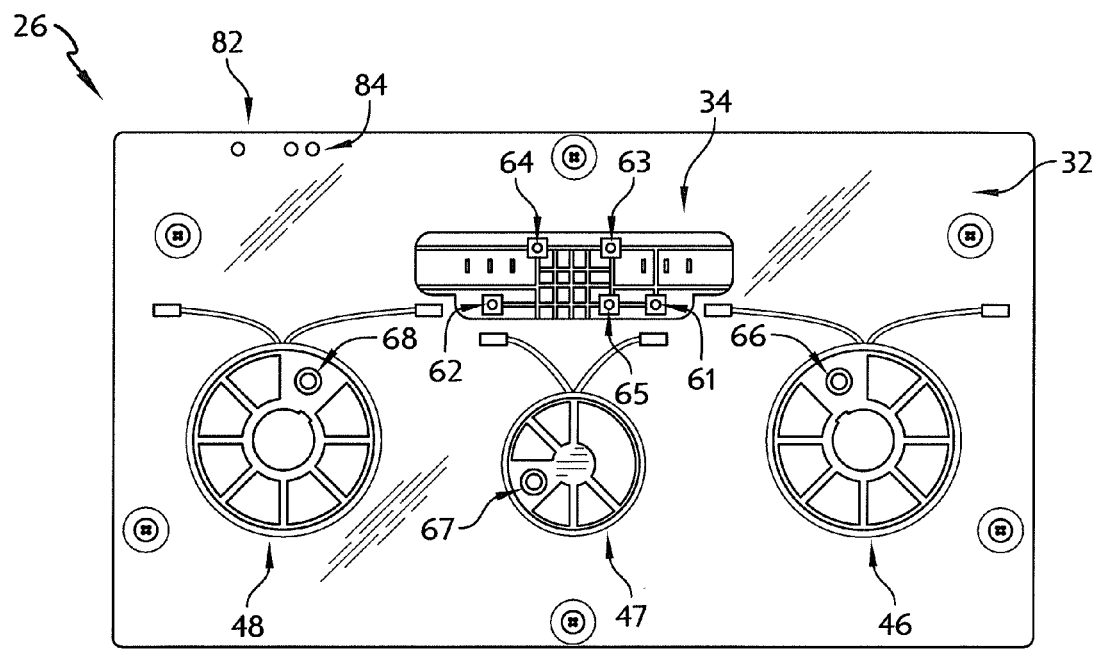
FIG. 5 is a rear elevation view of the face plate of FIG. 4 showing that knobs included in the face plate have contact balls that engage the contact sensor when the knobs are rotated by a user and that buttons included in the face plate have contact pins that engage the contact sensor when the buttons are pressed by a user.

The control elements 34 of face plate 26 illustratively include a plurality of buttons 41-45 and a plurality of knobs 46-48 as shown in FIG. 5. The buttons 41-45 are coupled to the mount frame 32 to slide relative to the mount frame 32 and are configured exert pressure in preselected positions on the contact sensor 24 when pressed by a user. The knobs 46-49 are coupled to the mount frame 32 to rotate relative to the mount frame 32 and exert pressure on the contact sensor 24 in predetermined positions when turned by a user. In some embodiments, other types of control element such as sliders, switches, and the like may be included in the face plate 26.

Figure 4:
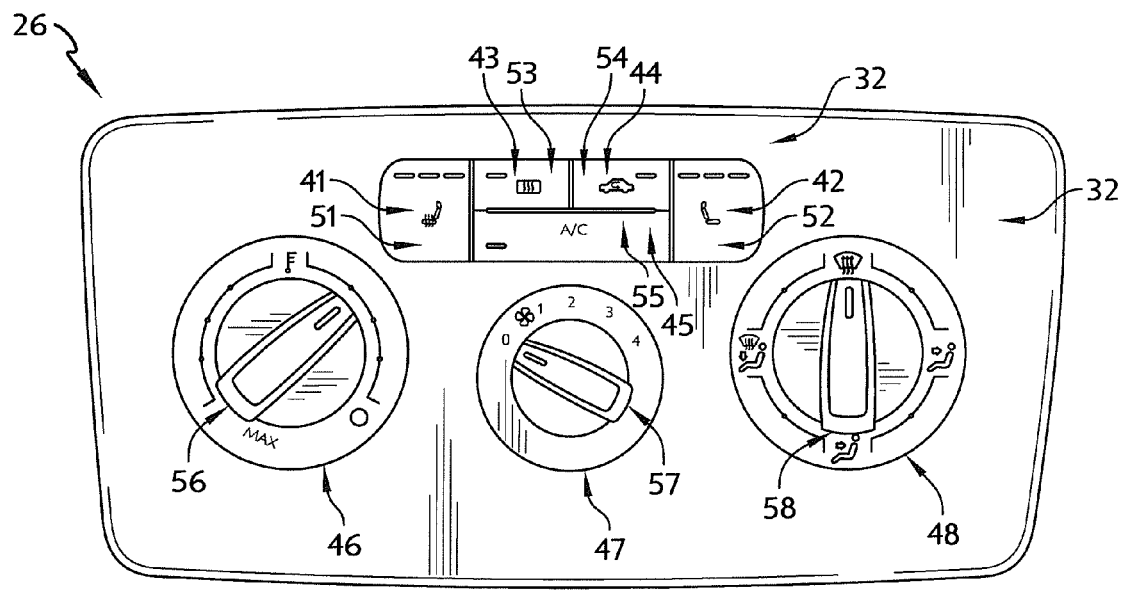
FIG. 4 is a front elevation view of the first face plate shown in FIGS. 1 and 2 showing that the face plate includes a mount frame, a number of rotatable knobs, and a number of buttons.

Each button 41-45 illustratively includes a corresponding interface tab 51-55 and contact pin 61-65 as shown in FIGS. 4 and 5. The interface tabs 51-55 include markings and/or transparent indicia suggesting the functions controlled by interaction with the button 41-45 and are sized to be pressed by a user. The contact pins 61-65 extend from the interface tabs 51-55 toward the contact sensor 24 so that the contact pins 61-65 engage the contact sensor 24 when a user presses the corresponding interface tab 51-55. In the illustrative embodiment, snap domes (not shown) are coupled between the buttons 41-45 to the mount frame 32 to bias the buttons 41-45 away from the contact sensor 24 and to provide tactile feedback to a user when pressing the buttons 41-45.

Each button 41-45 is illustratively movable relative to the mount frame 32 between a deactivated position, a touch-activation position, and a push-activation position as suggested in FIGS. 1 and 2. In the deactivated position, a button 41-45 is spaced apart from or in light contact with the contact area 25. In the touch-activation position, a button 41-45 applies a touch-activation pressure on the contact area 25 in response to a user applying a touch force on to the button 41-45 as suggested in FIG. 1. In the fully-activated position, a button 41-45 applies a push-activation pressure, greater than the touch-activation pressure, on the contact area 25 in response to a user applying a press force, greater than the touch force, onto the button 41-45 as suggested in FIG. 2.

In the illustrative embodiment, the buttons 41-45 are associated with a temperature control subsystem 12 as suggested in FIG. 3. More particularly the button 41 is associated with a driver-side seat warmer; the button 42 is associated with a passenger-side seat warmer; the button 43 is associated with a rear-window defroster; the button 44 is associated with an air recirculator; and the button 45 is associated with an air conditioner. In other embodiments, the buttons 41-45 may be associated with an infotainment subsystem 13, a communication subsystem 14, or another subsystem of the passenger vehicle 10.

Each knob 46-48 illustratively includes a corresponding interface handle 56-58 and contact ball 66-68 as shown in FIGS. 4 and 5. The interface handles 56-56 may be gripped and rotated by a user. The contact balls 66-68 are coupled to the interface handles 56-58 and engage the contact sensor 24 along a predetermined path when a user turns the corresponding interface handle 56-58. In the illustrative embodiment, the contact balls 66-68 are freely rotating and spring-loaded to reduce wear on the contact air and on the contact balls 66-68 themselves. This arrangement may also mitigate inconsistency in distance between the face plate 26 and the contact area 25. Inconsistency in distance between the face plate 26 and the contact area 25 may result from multiple changes of the face plate 26, vibration during operation of the passenger vehicle 10, manufacturing differences, material warping, etc. In the illustrative embodiment, ball-nosed spring detents (not shown) apply pressure onto the knobs 46-48 as the knobs 46-48 rotate to provide tactile feedback to a user when turning the knobs 46-48.

In the illustrative embodiment, the knobs 46-48 are associated with the temperature control subsystem 12 as suggested in FIG. 3. More particularly the knob 46 is associated with a temperature setting; the knob 47 is associated with a fan setting; and the knob 48 is associated with an air-distribution setting. In other embodiments, the knobs 46-48 may be associated with the infotainment subsystem 13, the communication subsystem 14, or another subsystem of the passenger vehicle 10.

The controller 18 illustratively includes a memory 72 and a processor 74 coupled to the memory 72 as shown diagrammatically in FIG. 3. The memory 72 may be of any type suitable for holding instructions and/or other types of information. The processor 74 may be of any type suitable for reading information from the memory 72 and for performing instructions contained therein.

In some implementations of the disclosed passenger vehicle 10, the controller 18 may provide a function preview when a user touches a button 41-45 before adjusting a parameter when a user pushes the button as suggested in FIGS. 1 and 2. Additionally, more in-depth information about the function controlled by a button 41-45 could be displayed when the button 41-45 is touched before it is pushed. Such a preview could be provided on the display 16 or provided via lights visible through the face plate 26. In one example, the controller 18 may display words indicating that a touched button 42 is associated with a passenger seat warmer parameter and a graphic suggesting that the seat warmer parameter will be increased if the button 42 is pushed as shown in FIG. 1. The controller 18 may then display the words and an updated graphic suggesting that the seat warmer parameter is changed after the button is pushed as shown in FIG. 2. In other examples, the controller 18 may preview the association and function of touched buttons associated with audio volume parameters, audio track/next track parameters, desired temperature parameters, and other parameters.

Particularly, the controller 18 may display indicia suggestive of a parameter that will be changed and/or suggestive of how that parameter will be changed in response to a button 41-45 being moved to the touch-activation position. Further, the controller 18 may change the parameter in response to the button 41-45 being moved to the push-activation position. In some embodiments, the controller 18 may provide such a preview feature when a user touches a knob, switch, slider, or other control element before the user applies a greater input force to move the knob, switch, slider, or other control element.

In some implementations of the disclosed passenger vehicle 10, the controller 18 may provide pressure-variable adjustment of parameters at different rates based on the amount of pressure applied by a user onto a button 41-45. For example, a parameter could be adjusted more quickly when a user presses hard on a button 41-45 than when a user presses softly on the button 41-45. In one example, the controller 18 may change a desired temperature parameter at the rate of one degree per second in response to a user pushing a desired temperature button with a first amount of force and may change a desired temperature parameter at the rate of five degrees per second in response to a user pushing the desired temperature button with a second, greater, amount of force. Such pressure-sensitive operation may also be applied to changes in fan speeds, audio volume, contact scrolling, and other parameters.

Particularly, the controller 18 may adjust a parameter of at least one subsystem at a first rate of change in response to receipt of a signal from the modular control panel 20 associated with a button 41-45 being moved to the push-activation position and maintained in that position by a first amount of force. Further, the controller 18 may adjust the parameter of the at least one subsystem at a second rate of change, greater than the first rate of change, in response to receipt of a signal from the modular control panel 20 associated with the button 41-45 being moved to the push-activation position and maintained in that position by a second amount of force, greater than the first amount of force.

In the illustrative embodiment, the pressure-sensitive pad 28 included in the contact sensor 24 provides a single, substantially monolithic contact area 25 as suggested in FIGS. 1 and 2. The contact area 25 is unitary and integral to read a pressure/touch event anywhere in the contact area 25. Exemplary pressure-sensitive pad 28 that may be used in the modular control panel 20 are available from Tactonic Technologies, LLC of Long Island City, N.Y. Unlike some Printed Circuit Boards (PCBs) used with specific control elements, the contact area 25 is not divided into separated sensitive regions associated with a particular control element layout. Thus, modular control panels 20 including the contact sensor 24 may be used with a variety of face plates (e.g., 26, 226, 326) to provide a modular control panel system 80 adapted for use in passenger vehicles for various markets and/or with various trim levels.

The modular control panel 20 also illustratively includes a face-plate-identification mechanism 82 that determines which face plate 26, 226, 326 is mounted adjacent to the contact sensor 24 as suggested in FIG. 5. The face-plate-identification mechanism 82 allows the microcontroller 30 included in the contact sensor 24 of the modular control panel 20 to provide signals to the controller 18 associated with control elements 34 included in a particular face plate 26, 226, 326 coupled to the contact sensor 24.

In the illustrative embodiment, the face-plate-identification mechanism 82 includes a plurality of identification protrusions 84 that extend from the mount frame 32 of the face plate 26 as shown in FIG. 5. The identification protrusions 84 engage the contact area 25 of the contact sensor 24 in a predetermined location when the face plate 26 is mounted adjacent to the contact sensor 24 so that the microcontroller 30 can identify the face plate 26.

In other embodiments, the face-plate-identification mechanism 82 may include a pattern of metallic pins coupled to the face plate 26 that engage at least some complementary metallic contacts coupled to the contact sensor 24. When the pattern of metallic pins engages the complementary metallic contacts, the contact sensor 24 may identify the face plate 26 by comparing the pattern of metallic pins to a list of known face plate patterns. In still other embodiments, the face-plate-identification mechanism 82 may include a Radio Frequency Identification (RFID) tag coupled to the face plate 26 and a corresponding radio frequency sensor coupled to the contact sensor 24. When the RFID tag is moved into close proximity to the radio frequency sensor, the contact sensor 24 may identify the face plate 26. In still other embodiments, other types of identification system may be used to provide the face-plate-identification mechanism 82.

Figure 6:
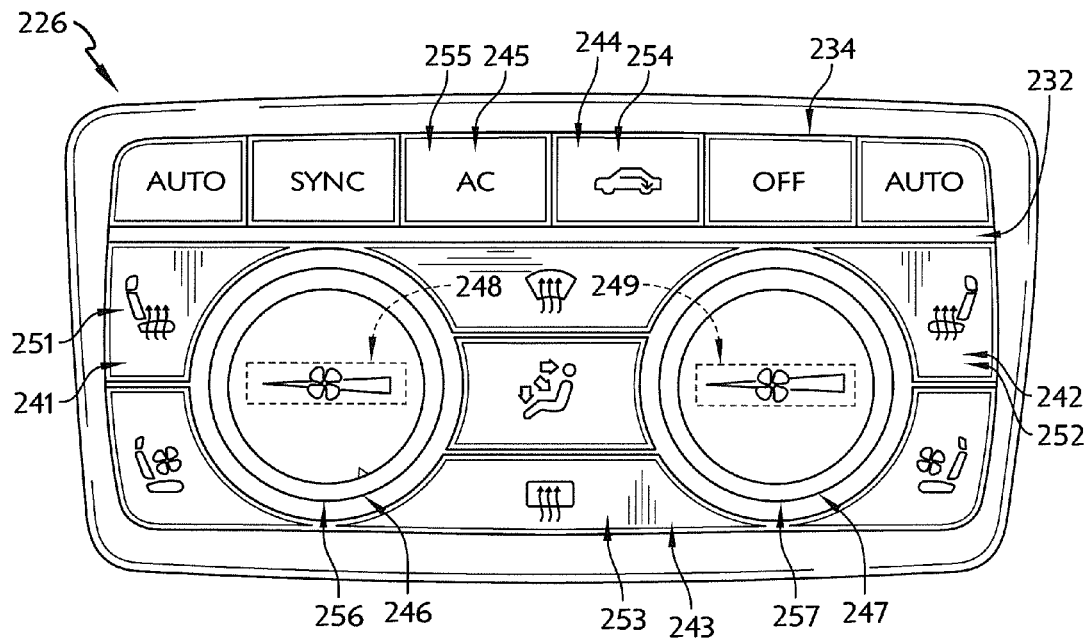
FIG. 6 is a front elevation view of a second face plate that may be interchangeable with the face plate of FIGS. 4 and 5 showing that the face plate includes a mount frame, a pair of rotatable knobs, a pair of deformable linear touch sliders arranged in the rotatable knobs, and a number of buttons.
Figure 7:
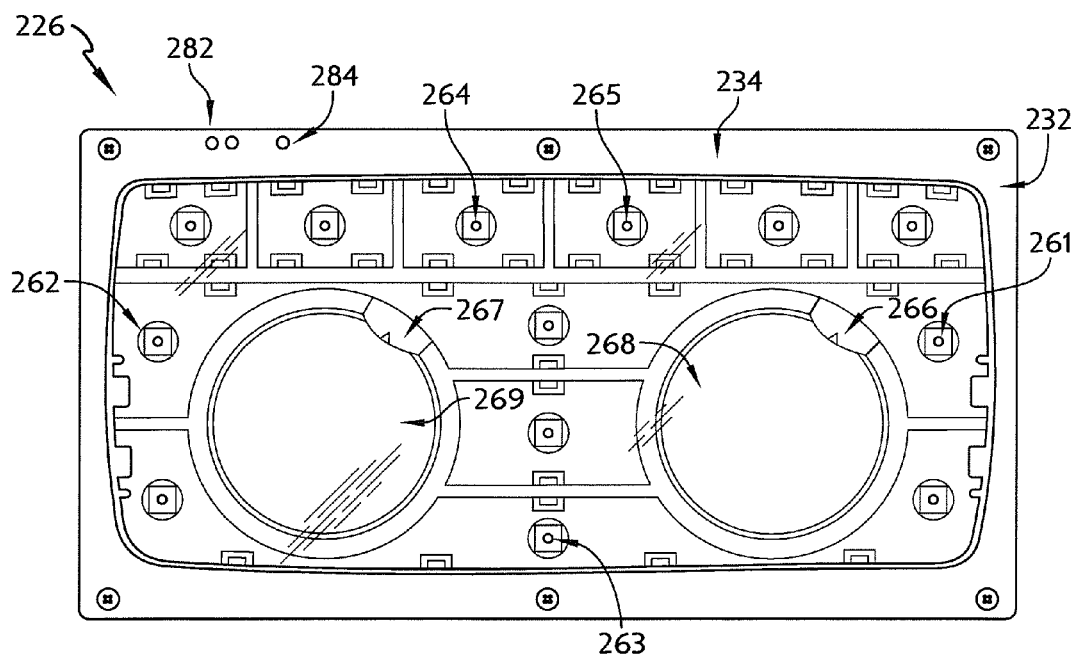
FIG. 7 is a rear elevation view of the face plate of FIG. 6 showing that knobs included in the face plate have contact fingers that engage the contact sensor when the knobs are rotated by a user, that the linear touch sliders include a silicone backing that engages the contact sensor when the linear sliders are swiped by a user, and that the buttons included in the face plate have contact pins that engage the contact sensor when the buttons are pressed by a user.

A second face plate 226 adapted for use in passenger vehicle 10 with contact sensor 24 is shown in FIGS. 6 and 7. The face plate 226 is interchangeable with the face plate 26 within modular control panel 20 and, along with the contact sensor 24 and the face plate 26, is part of the modular control panel system 80.

The face plate 226 may extend over the pressure-sensitive pad 28 included in the contact sensor 24 and to exert pressure onto the pressure-sensitive pad 28 in predetermined locations when a user interacts with the face plate 226 as suggested in FIG. 6. The face plate 226 includes a mount frame 232 and a plurality of control elements 234 coupled to the mount frame 232. The mount frame 232 is illustratively rigid and includes a plurality of apertures 236. The control elements 234 extend through the apertures 236 formed through the mount frame 232 toward the pressure-sensitive pad 28 and move relative to the mount frame 232 in response to user interaction with particular control elements 234 so that pressure is applied by the control elements 234 onto the pressure-sensitive pad 28.

The control elements 234 of face plate 226 illustratively include a plurality of buttons 241-245 (among others), a pair of knobs 246, 247, and a pair of linear touch sliders 248, 249 as shown in FIG. 6. The buttons 241-245 are coupled to the mount frame 232 to slide relative to the mount frame 232 and are configured to exert pressure in preselected positions on the contact sensor 24 when pressed by a user. The knobs 246, 247 are coupled to the mount frame 232 to rotate relative to the mount frame 232 and exert pressure on the contact sensor 24 in predetermined positions when turned by a user. The linear touch sliders 248, 249 are mounted within the knobs 246, 247 and allow pressure exerted by a user during a swipe gesture along the sliders 248, 249 to be transmitted to the contact sensor 24.

Each button 241-245 illustratively includes a corresponding interface tab 251-255 and contact pin 261-265 as shown in FIGS. 6 and 7. The interface tabs 251-255 include markings suggesting the functions controlled by interaction with the button 241-245 and are to be pressed by a user. The contact pins 261-265 extend from the interface tabs 251-255 toward the contact sensor 24 so that the contact pins 261-265 engage the contact sensor 24 when a user presses the corresponding interface tab 251-255. In the illustrative embodiment, snap domes (not shown) are coupled between the buttons 241-245 to the mount frame 232 to bias the buttons 241-245 away from the contact sensor 24 and to provide tactile feedback to a user when pressing the buttons 241-245. Each button 241-245 is illustratively movable relative to the mount frame 232 between the deactivated position, the touch-activation position, and the push-activation position as described above. The buttons 241-245 are illustratively associated with various parameters of a temperature control subsystem.

Each knob 246, 247 illustratively includes a corresponding interface handle 256, 257 and contact finger 266, 267 as shown in FIGS. 6 and 7. The interface handles 256, 257 may be gripped and rotated by a user. The contact fingers 266, 267 are coupled to the interface handles 256, 257 and engage the contact sensor 24 along a predetermined path when a user turns the corresponding interface handle 256, 257. In the illustrative embodiment, the knobs 246, 247 are associated with an infotainment subsystem to control volume and radio channel.

Each linear touch slider 248, 249 illustratively has a corresponding silicone backing 258, 259 as shown in FIGS. 6 and 7. The silicone backing 258, 259 deforms to transmit pressure from a user swiping along the linear touch sliders 248, 249 on to the contact sensor 24. The linear touch sliders 248, 249 are illustratively associated with fan speed parameters of a temperature control subsystem.

The second face plate 226 also includes a plurality of identification protrusions 284 that extend from the mount frame 232 of the face plate 226 as part of the face-plate-identification mechanism 82 as shown in FIG. 7. The identification protrusions 284 engage the contact area 25 of the contact sensor 24 in a predetermined location when the face plate 226 is mounted adjacent to the contact sensor 24 so that the microcontroller 30 can identify the face plate 226.

Figure 8:
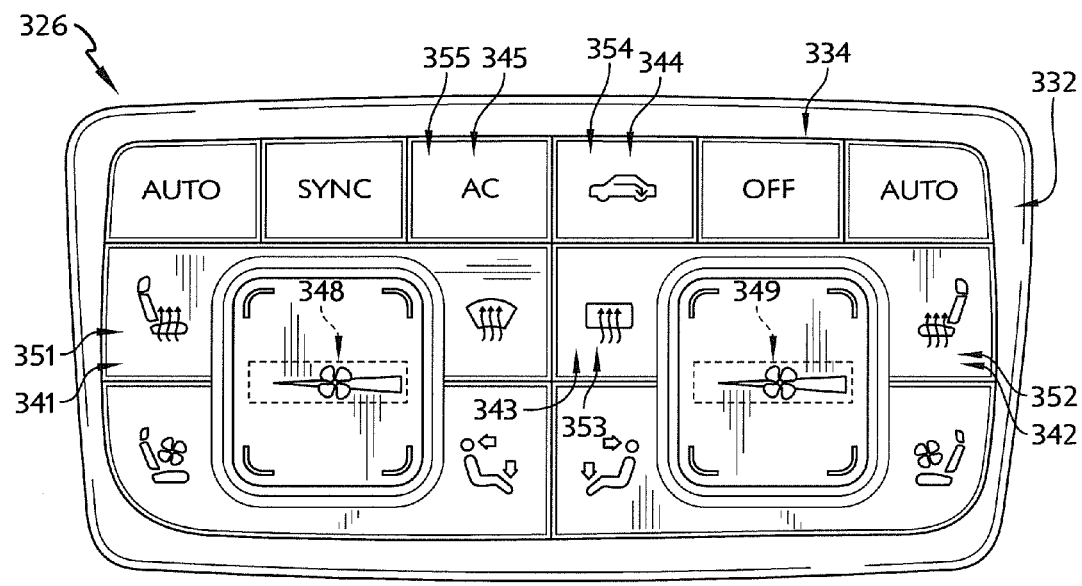
FIG. 8 is a front elevation view of a third face plate that may be interchangeable with the face plates of FIGS. 4-7 showing that the face plate includes a mount frame, a number of buttons and a pair of linear touch sliders.
Figure 9:
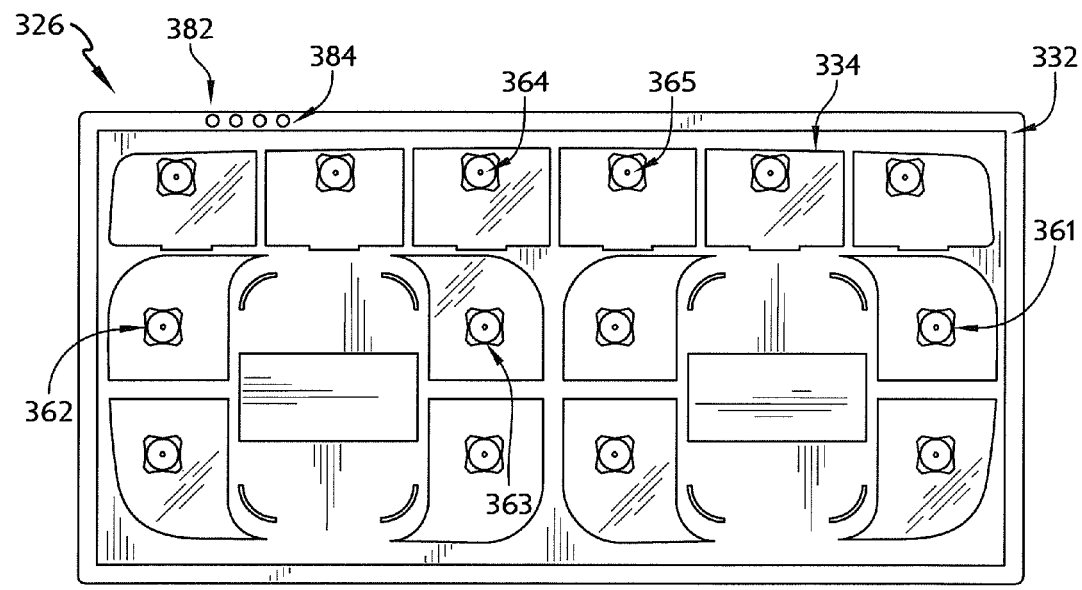
FIG. 9 is a rear elevation view of the face plate of FIG. 8 showing that the buttons included in the face plate have contact pins that engage the contact sensor when the buttons are pressed by a user and that the linear touch sliders include a silicone backing that engages the contact sensor when the sliders are swiped by a user.

A third face plate 326 adapted for use in passenger vehicle 10 with contact sensor 24 is shown in FIGS. 8 and 9. The face plate 326 is interchangeable with the face plate 26 within modular control panel 20 and, along with the contact sensor 24 and the face plate 26, is part of the modular control panel system 80.

The face plate 326 may extend over the pressure-sensitive pad 28 included in the contact sensor 24 and to exert pressure onto the pressure-sensitive pad 28 in predetermined locations when a user interacts with the face plate 326 as suggested in FIG. 8. The face plate 326 includes a mount frame 332 and a plurality of control elements 334 coupled to the mount frame 332. The mount frame 332 is illustratively rigid and includes a plurality of apertures 336. The control elements 334 extend through the apertures 336 formed through the mount frame 332 toward the pressure-sensitive pad 28 and move relative to the mount frame 332 in response to user interaction with particular control elements 334 so that pressure is applied by the control elements 334 onto the pressure-sensitive pad 28.

The control elements 334 of face plate 326 illustratively include a plurality of buttons 341-345 (among others) and a pair of touch pads 348, 349 as shown in FIG. 8. The buttons 341-345 are coupled to the mount frame 332 to slide relative to the mount frame 332 and are configured exert pressure in preselected positions on the contact sensor 24 when pressed by a user. The touch pads 348, 349 allow pressure exerted by a user during a swipe gestures horizontally or vertically along the pads 348, 349 to be transmitted to the contact sensor 24.

Each button 341-345 includes a corresponding interface tab 351-355 and contact pin (not shown) illustrated, for example, in FIGS. 8 and 9. The interface tabs 351-355 include markings suggesting the functions controlled by interaction with the button 341-345 and may be pressed by a user. The contact pins 361-365 extend from the interface tabs 351-355 toward the contact sensor 24 so that the contact pins 361-365 engage the contact sensor 24 when a user presses the corresponding interface tab 351-355. In the illustrative embodiment, snap domes 361-365 are coupled between the buttons 341-345 to the mount frame 332 to bias the buttons 341-345 away from the contact sensor 24 and to provide tactile feedback to a user when pressing the buttons 341-345. Each button 341-345 is illustratively movable relative to the mount frame 332 between the deactivated position, the touch-activation position, and the push-activation position as described above. The buttons 341-345 are illustratively associated with various parameters of a temperature control subsystem. The touch pads 348, 349 are illustratively associated with fan speed parameters (horizontal swipes) and temperature parameters (vertical swipes) of a temperature control subsystem.

The third face plate 326 also includes a plurality of identification protrusions 384 that extend from the mount frame 332 of the face plate 326 as part of the face-plate-identification mechanism 82 as shown in FIG. 9. The identification protrusions 384 engage the contact area 25 of the contact sensor 24 in a predetermined location when the face plate 326 is mounted adjacent to the contact sensor 24 so that the microcontroller 30 can identify the face plate 326.

Figure 10:
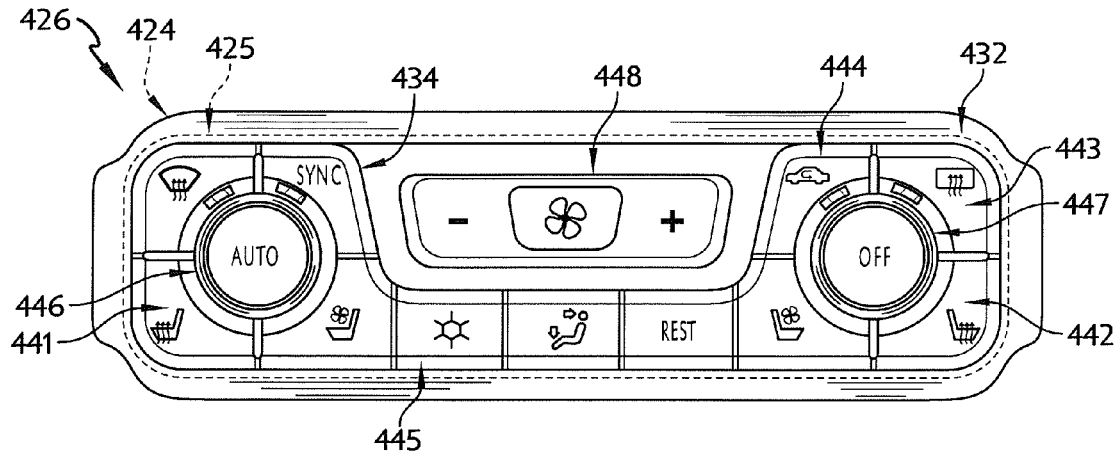
FIG. 10 is a front elevation view of a fourth face plate adapted for use in another modular control panel having a contact sensor arranged under the fourth face plate showing that the face plate includes a mount frame, a pair of knobs, a number of buttons, and a pivot switch all mounted to move relative to the mount frame.

A fourth face plate 426 adapted for use in a passenger vehicle with a contact sensor 424 to provide a modular control panel 420 is shown, for example, in FIG. 10. The modular control panel 420 is substantially similar to the modular control panel 20 except the size of the contact sensor 424 and the face plate 426 is adjusted for use in different passenger vehicle applications. The contact sensor 424 has a pressure-sensitive pad (not shown) that defines a substantially monolithic contact area 425 as shown in FIG. 10.

The face plate 426 illustratively includes a mount frame 432 and a number of control elements 434 as shown in FIG. 10. The control elements 434 illustratively include a number of buttons 441-445 (among others), a pair of knobs 446, 447, and a pivot switch 448 all extending through apertures 436 formed in the mount frame 432. The buttons 441-445 (among others), knobs 446, 447, and pivot switch 448 are all mounted to move relative to the mount frame 432.

Figure 11:
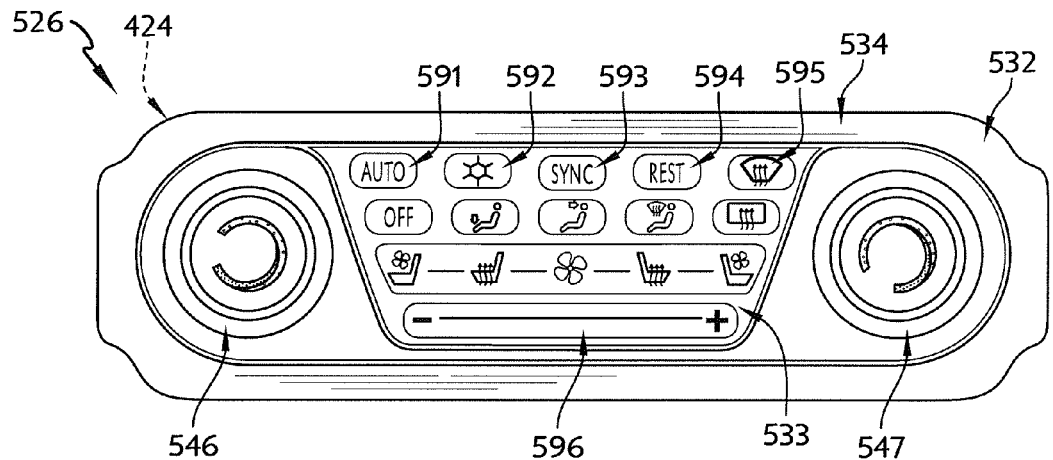
FIG. 11 is a front elevation view of a fifth face plate that may be interchangeable with the face plate of FIG. 10 showing that the face plate includes a mount frame, a pair of knobs coupled to the mount frame to move relative to the mount frame, a flexible membrane, a number of press indentations formed in the membrane, and a slide indentation formed in the membrane.

A fifth face plate 526 adapted for use in a passenger vehicle with contact sensor 424 is shown in FIG. 11. The face plate 526 is interchangeable with the face plate 426 within modular control panel 420 and, along with the contact sensor 424 and the face plate 426, is part of the modular control panel system 480.

The face plate 526 illustratively includes a mount frame 532, a flexible membrane 533, and a number of control elements 534 as shown in FIG. 11. The control elements 534 a pair of knobs 546, 547, a plurality of press indentations 591-595 (among others), and a slide indentation 596. The knobs 546, 547 extend through the mount frame 532 to engage the contact sensor 424 and rotate relative to the mount frame 532. The press indentations 591-595 are formed by the flexible membrane 533 and extend toward the contact sensor 424 so that the flexible membrane 533 transmits pressure to the contact sensor 424 in a predetermined position when a user pushes a press indentation 591-595. The slide indentation 596 is formed by the flexible membrane 533 and extends toward the contact sensor 424 along a linear path across a portion of the flexible membrane 533. Thus, the flexible membrane 533 transmits pressure to the contact sensor 424 along a predetermined path when a user swipes along the slide indentation 596.

Figure 12:
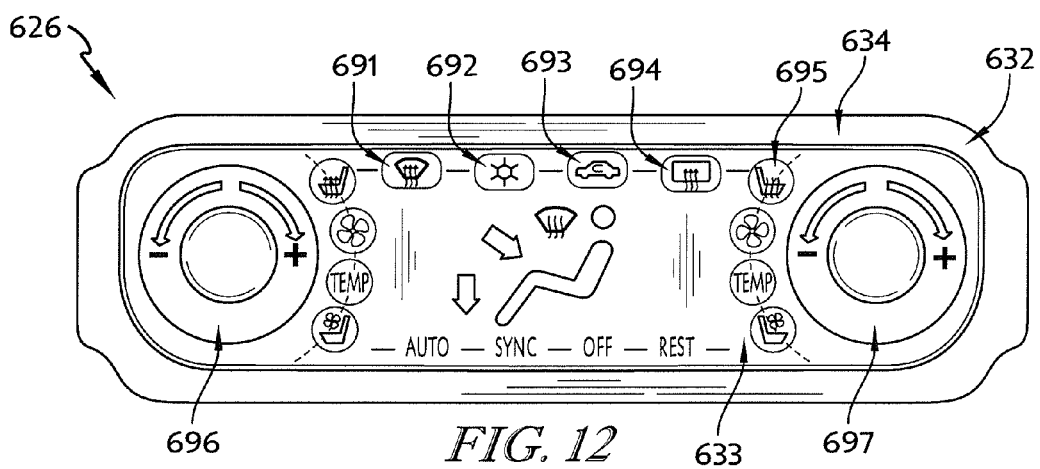
FIG. 12 is a front elevation view of a sixth face plate that may be interchangeable with the face plate of FIGS. 10 and 11 showing that the face plate includes a flexible membrane, a pair of circular slider indentations formed in the membrane, and a number of press indentations formed in the membrane.

A sixth face plate 626 adapted for use in a passenger vehicle with contact sensor 424 is shown in FIG. 12. The face plate 626 is interchangeable with the face plate 426 within modular control panel 420 and, along with the contact sensor 424 and the face plate 426, is part of the modular control panel system 480.

The face plate 626 illustratively includes a mount frame 632, a flexible membrane 633, and a number of control elements 634 as shown in FIG. 12. The control elements 634 include a number of press indentations 691-695 (among others) and a pair of circular slider indentations 696, 697. The press indentations 691-695 and the circular slider indentations 696, 697 are foamed by the flexible membrane 633. All the indentations 691-697 extend toward the contact sensor 424 so that the flexible membrane 633 transmits pressure to the contact sensor 424 in a predetermined position when a user pushes a press indentation 691-695 or slides her finger around a circular path associated with a circular slider indentation 696, 697.

Some passenger vehicles include control panels for receiving and communicating user inputs associated with various subsystems (e.g., temperature control subsystems, communication subsystems, infotainment subsystems, etc.). Such control panels can include a face plate used in conjunction with a face-plate-specific printed circuit board (PCB) that underlies the face plate. The use of control panels that include face-plate-specific printed circuit boards presents technical problems relating to the need for various face plate layouts that are required for passenger vehicles of different trim levels or for different markets in which users have different expectations for control panel layout/operability.

Embodiments of the present disclosure provide a solution to the technical problem that various face plates are needed for use in different applications leading to the need for corresponding face-plate-specific printed circuit boards which can be costly. Specifically, the present disclosure provides a modular control panel system including a contact sensor that may be used with a variety of different face plates.

Other control panels used in passenger vehicles can include touch-screen control panels such as Liquid Crystal Displays (LCDs) or other touch-screen interfaces. The use of touch-screen control panels, while capable of providing various layouts, presents technical problems relating to the need for tactile feedback and constantly located control elements.

Embodiments of the present disclosure provide a solution to the technical problem that some touch-screen control panels that are interoperable in various applications do not provide tactile feedback or constant control element location to a user. Specifically, the present disclosure provides a modular control panel system including control elements that give tactile feedback to a user and that are constantly located over the control panel allowing a user to manipulate the control panel while maintaining a view of the road.

Although certain illustrative embodiments have been described in detail above, variations and modifications exist within the scope and spirit of this disclosure as described and as defined in the claims included in this application.

The invention claimed is:

1. A modular control panel adapted for use in a passenger vehicle dashboard, the modular control panel comprising
   a contact sensor that detects contacts over a substantially monolithic contact area, and
   a face plate that extends over the substantially monolithic contact area, the face plate including a mount frame and a plurality of movable control elements each coupled to the mount frame to move relative to the mount frame, each of the plurality of movable control elements engage the substantially monolithic contact area of the contact sensor in response to a user moving the movable control elements relative to the mount frame,
   wherein at least one of the plurality of movable control elements is a button coupled to the mount frame to move relative to the mount frame and at least one of the moveable control elements is a knob coupled to the mount frame to rotate relative to the mount frame about an axis.

2. The modular control panel of claim 1, wherein the button is coupled to the mount frame to move from a deactivated position spaced apart from or lightly contacting the substantially monolithic contact area to a push-activation position that engages the substantially monolithic contact area and the knob is coupled to the mount frame to rotate from a first position engaging the substantially monolithic contact area at a first location along a circle that extends around the axis to a second position that engages the substantially monolithic contact area at a second location along the circle that extends around the axis.

3. The modular control panel of claim 1, wherein the face plate includes a flexible membrane that includes a main sheet and a plurality of deformable control elements that engage the substantially monolithic contact area of the contact sensor in response to a user applying a force onto the deformable control elements.

4. The modular control panel of claim 3, wherein at least one of the deformable control elements is an indentation extending from the main sheet toward the substantially monolithic contact area of the contact sensor.

5. The modular control panel of claim 4, wherein the indentation is elongated to form a channel sized to receive a fingertip and to allow a fingertip to swipe along the channel.

6. A passenger vehicle comprising:
a plurality of subsystems;
a controller coupled to the subsystems to direct operation of the plurality of subsystems; and
a modular control panel coupled to the controller to provide signals to the controller indicative of user inputs received by the modular control panel associated with the plurality of subsystems, the modular control panel including a contact sensor that detects contacts over a substantially monolithic contact area and a face plate extending over the substantially monolithic contact area,
wherein the face plate includes a mount frame and a plurality of movable control elements each coupled to the mount frame to move relative to the mount frame, each of the plurality of movable control elements engage the substantially monolithic contact area of the contact sensor in response to a user moving the movable control elements relative to the mount frame,
wherein at least one of the plurality of movable control elements is a button coupled to the mount frame to slide relative to the mount frame from a deactivated position spaced apart from or lightly contacting the substantially monolithic contact area to a touch-activation position apply a touch-activation pressure on the substantially monolithic contact area in response to a user applying a touch force on to the button and further to a fully-activated position apply a push-activation pressure, greater than the touch-activation pressure, on the substantially monolithic contact area in response to a user applying a press force, greater than the touch force, on to the button.

7. The passenger vehicle of claim 6, wherein the controller adjusts a parameter of at least one subsystem at a first rate of change in response to receipt of a signal from the modular control panel associated with the button being moved to the push-activation position and maintained in the push-activation position by a first amount of force and the controller adjusts the parameter of the at least one subsystem at a second rate of change, greater than the first rate of change, in response to receipt of a signal from the modular control panel associated with the button being moved to the push-activation position and maintained in the push-activation position by a second amount of force, greater than the first amount of force.

8. The passenger vehicle of claim 6, further comprising a display coupled to the controller, wherein the controller displays indicia suggestive of a parameter of at least one subsystem that will be changed in response to receipt of a signal from the modular control panel associated with the button being moved to the touch-activation position and the controller changes the parameter of the at least one subsystem in response to receipt of a signal from the modular control panel associated with the button being moved to the push-activation position.

9. The passenger vehicle of claim 6, wherein at least one of the plurality of movable control elements is a button coupled to the mount frame to move relative to the mount frame and at least one of the plurality of moveable control elements is a knob coupled to the mount frame to rotate relative to the mount frame about an axis.

10. The passenger vehicle of claim 9, wherein the button is coupled to the mount frame to move from a deactivated position spaced apart from or lightly contacting the substantially monolithic contact area of the contact sensor to a push-activation position engaging the substantially monolithic contact area of the contact sensor at a predetermined pressure and the knob coupled to the mount frame to rotate from a first position engaging the substantially monolithic contact area of the contact sensor at a first location along a circle that extends around the axis to a second position engaging the substantially monolithic contact area of the contact sensor at a second location along the circle that extends around the axis.

11. The passenger vehicle of claim 9, wherein the face plate includes a flexible membrane that includes a main sheet and a plurality of deformable control elements engaging the substantially monolithic contact area of the contact sensor in response to a user applying a force onto the deformable control elements.

12. The passenger vehicle of claim 11, wherein at least one of the deformable control elements is an indentation extending from the main sheet toward the substantially monolithic contact area of the contact sensor.

13. A modular control panel system for use in a passenger vehicle, the modular control panel system comprising
a contact sensor detects contacts over a substantially monolithic contact area,
a first face plate sized to extend over the substantially monolithic contact area of the contact sensor, the first face plate including a first mount frame and a first plurality of movable control elements, and
a second face plate sized to extend over the substantially monolithic contact area of the contact sensor, the second face plate including a second mount frame and a second plurality of movable control elements, different from the first plurality of movable control elements.

14. The modular control panel system of claim 13, wherein at least one of the first plurality of movable control elements is a button coupled to the mount frame to move relative to the mount frame and at least one of the first plurality of moveable control elements is a knob coupled to the mount frame to rotate relative to the mount frame about an axis.

15. The modular control panel system of claim 14, wherein the first face plate includes a first flexible membrane that includes a first main sheet and a first plurality of deformable control elements engaging the substantially monolithic contact area of the contact sensor in response to a user applying a force onto the deformable control elements.

16. The modular control panel of claim 15, wherein at least one of the first plurality deformable control elements is an indentation extending from the first main sheet toward the substantially monolithic contact area of the contact sensor.

17. The modular control panel system of claim 13, further comprising a face-plate-identification mechanism that determines if the first face plate is mounted adjacent to the contact sensor or if the second face plate is mounted adjacent to the contact sensor.

18. The modular control panel system of claim 17, wherein the face-plate-identification mechanism includes at least one identification protrusion that extends from the mount frame of the first face plate, the at least one identification protrusion engaging the substantially monolithic contact area of the contact sensor in a predetermined location when the first face plate is mounted adjacent to the contact sensor.

19. The modular control panel of claim 13, wherein the contact sensor includes a pressure-sensitive pad.

20. The modular control panel of claim 13, wherein the contact sensor includes a sensor selected from a capacitive pad, an optical sensor, and a magnetic field distortion sensor.

\* \* \* \* \*